(12) United States Patent
Ellmann et al.

(10) Patent No.: US 7,841,564 B2
(45) Date of Patent: Nov. 30, 2010

(54) DEVICE FOR AUTOMATICALLY CONTROLLING A TRACK-BOUND VEHICLE

(75) Inventors: Siegfried Ellmann, Aschheim (DE); Friedrich Loeser, Riemerling (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 580 days.

(21) Appl. No.: 11/547,231

(22) PCT Filed: Apr. 6, 2005

(86) PCT No.: PCT/DE2005/000608

§ 371 (c)(1),
(2), (4) Date: Oct. 3, 2006

(87) PCT Pub. No.: WO2005/100077

PCT Pub. Date: Oct. 27, 2005

(65) Prior Publication Data

US 2008/0277534 A1    Nov. 13, 2008

(30) Foreign Application Priority Data

Apr. 13, 2004   (DE) ...................... 10 2004 018 311

(51) Int. Cl.
*B61L 3/00* (2006.01)
(52) U.S. Cl. ................................ 246/182 C
(58) Field of Classification Search ............ 246/167 R, 246/182 R, 182 A, 182 C, 27, 28 R
See application file for complete search history.

(56) References Cited

U.S. PATENT DOCUMENTS

| 4,359,247 A | 11/1982 | Miller |
| 4,988,061 A | 1/1991 | Miller et al. |
| 5,053,654 A | 10/1991 | Augsburger et al. |
| 5,467,945 A * | 11/1995 | Kubota et al. .................. 246/26 |

FOREIGN PATENT DOCUMENTS

| DE | 30 04 705 | 8/1981 |
| DE | 33 03 961 | 8/1983 |

(Continued)

OTHER PUBLICATIONS

Karsten Blank et al: "Antrieb Und Energieversirgung Des . . . " Zevrail Glasers Annalen—Sonderheft Transrapid 2003, pp. 70-87 (With Eng. Abst.).

(Continued)

*Primary Examiner*—S. Joseph Morano
*Assistant Examiner*—Robert J McCarry, Jr.
(74) *Attorney, Agent, or Firm*—Michael J. Striker

(57) ABSTRACT

A device for automatically controlling a track-bound vehicle, particularly a magnetic levitation vehicle is described. The device comprises a drive and brake system (4), an additional brake (9), a stationary mounted travel computer (5) and data carriers (10) arranged along the guideway for the supply of status signals in the form of location, speed or travel direction signals. In accordance with the invention the device also comprises means (12, 29) which are arranged for safely stopping and/or starting the vehicle at or from preselected target stopping points (15) within the stopping zones (A) and which are so configured that an immediate decoupling of the vehicle from the drive and brake system (4) is effected when an impermissible travel status within the area of a stopping zone (A) is reached (FIG. 1).

2 Claims, 2 Drawing Sheets

FOREIGN PATENT DOCUMENTS

| | | |
|---|---|---|
| DE | 38 07 919 | 9/1989 |
| DE | 39 17 058 | 11/1990 |
| DE | 196 53 728 | 6/1998 |
| DE | 199 20 620 | 2/2001 |
| WO | 91/09750 | 7/1991 |

OTHER PUBLICATIONS

Frank Schuenemann: "Die Betriebsleittechnik Des . . . " Zevrail Glasers Annalen—Sonderheft Transrapid 2003, pp. 88-94 (With Eng. Abst.).

\* cited by examiner

DEVICE FOR AUTOMATICALLY CONTROLLING A TRACK-BOUND VEHICLE

CROSS-REFERENCE TO RELATED APPLICATION

The invention described and claimed hereinbelow is also described in German Patent Application DE 10 2004 018 311.2 filed on Apr. 13, 2004. This German Patent Application provides the basis for a claim of priority of invention under 35 U.S.C. 119(a)-(d).

BACKGROUND OF THE INVENTION

The present invention relates to a device for automatically controlling a track-bound vehicle.

In a known device of this kind, particularly for magnetic levitation railways, the control of the generally driverless vehicle is performed from a stationary operation center, applying a redundantly configured operations management technology. A part thereof particularly is a travel computer which on the basis of prescribed data depending on the track profile controls the vehicle speed and brings the vehicle to a standstill within preselected stopping zones (central railway stations) in accordance with as schedule. Apart thereof, there may be other stopping zones (auxiliary stopping zones) in which the vehicle is stopped only in case of emergencies.

For example, in case of a magnetic levitation vehicle, long-stator motors serve for driving and comprise a long-stator extending along the guideway and being provided with grooves. Alternating current windings are laid in these grooves and are fed with a three-phase current of a variable amplitude and frequency in order to generate a travelling wave advancing along the long-stator. The excitation field is generated by carrying magnets arranged in the vehicle which apart from the carrying function, which causes the levitation, also provide the excitation field for the long-stator motor. The frequency of the travelling wave determines the vehicle speed, which is the reason why long-stator motors are apt both for driving and braking the vehicle.

To enable the vehicle to be brought to a standstill even in case of a failure of such a driving and braking system, it is equipped with an additional brake in form of a gripper brake (DE 30 04 705 A1), an eddy-current brake or the like.

To facilitate controlling of the vehicle from the operation center, it is furthermore known (DE 33 03 961 C1) to arrange at least one data carrier in form of a measuring strip or the like along the guideway, said data carrier containing absolute location data. In this case, a data acquisition detection unit is mounted in the vehicle which continually scans the data carrier to derive actual values for the location and speed of the vehicle and to transmit these actual values in the form of status signals, for example in wireless mode, to the operation center.

Stopping of a vehicle at preselected stopping targets of a stopping zone in general is achieved by controlling the speed of the vehicle by the aid of the driving and braking system in accordance with a given braking curve which, for example, is deposited in a control computer of the vehicle. Moreover, means are expediently provided for in the vehicle which may be part of the control computer and which compare the actual values of the vehicle speed obtained by scanning the data carriers with location-dependent limit values and/or permissible maximum speeds that are defined for each location (position) of the guideway and which are preferably also stored in the control computer. If it is determined that the permissible maximum speed has been reached or exceeded, this is regarded as a sign indicative for a defect in the driving and braking system. Consequently, a control signal indicating this fault is generated by the control computer. On the one hand, the control signal is transmitted in wireless mode per radio to the operation center in order to shut-off the driving and braking system, i.e. in case of a magnetic levitation vehicle to shut-off the electrical current flowing through the assigned long-stator winding. On the other hand, the control signal is supplied to the additional brake in order to switch it on and to brake the vehicle despite the defective driving and braking system and to bring it to a standstill at the preselected target stopping point of the stopping zone.

Devices of this kind as well as other possible braking maneuvers for these devices applied in particular on occurrence of various disturbances are widely known (e.g. z. B. DE 38 07 919 C2, DE 39 17 058 C1, ZEVrail Glasers Annalen, Special Edition Transrapid, October 2003, page 70 to 94 in particular).

A hitherto inevitable disadvantage of such control devices is that the transmission of control signals in wireless mode to the operation central is associated with non-negligible times for processing the control signals themselves and for switching-off the drive and brake system to be executed thereupon. The time delays caused thereby during initiation of brake maneuvers may lead to an overriding of preselected target stopping points in the stopping zones. This comes true especially if due to a deficient drive and brake system the vehicle is erroneously accelerated rather than slowed down during the time delays. Because of such operational disturbances which cannot be avoided it is required to provide a so-called connecting (extension) guideway downstream of the target stopping point of each stopping zone to prevent the vehicle from leaving the guideway when riding beyond the preselected target stopping point and from coming to a standstill in an inaccessible guideway section. It is to be considered insofar that a time delay of one second at a traveling speed of 200 km per hour corresponds to a path length of approximately 55 m.

Another operational disturbance may occur when starting the vehicle from a stopping zone due to commencing the starting phase with the wrong traveling direction because of a defect affecting the drive and brake system or the operations management technology. In this case, the time lags during a signal transmission and signal processing performed in wireless mode or the like may involve that a target stopping point in the wrong direction has already been exceeded by far before a command given by the operations management technology for stopping of the starting phase becomes effective.

Corresponding disadvantages in the area of stopping zones may result on existence of other traveling states of the vehicle.

SUMMARY OF THE INVENTION

In view thereof, the technical problem underlying the present invention is to configure the device of the species mentioned hereinabove in such a manner that the length of the connecting guideway to be provided for can be noticeably reduced.

In keeping with these objects and with others which will become apparent hereinafter, one feature of the present invention resides, briefly stated, in a device for automatically controlling a track-bound magnetic levitation vehicle, comprising a drive and brake system for the vehicle, said system including a long-stator linear motor with at least one long-stator arranged along a guideway and at least one electric magnet mounted at the vehicle which is switched-on during a travel and thus keeps the vehicle in a suspended status while furnishing at the same time an excitation field for the long-stator linear motor; stopping zones arranged along the guideway; an additional brake at the vehicle; a travel computer for the drive and brake system, with said travel computer being stationarily arranged outside the vehicle; data carriers arranged along the guideway for a supply of status signals concerning a location, speed and/or travel direction of the vehicle; and means provided in the vehicle for switching-off the drive and brake system and for switching-on the additional brake, if a scanning of the data carriers reveal an impermissible travel status for the vehicle, said means being arranged for safely stopping and/or starting the vehicle at or from preselected target stopping points within the stopping zones and being so configured that an immediate decoupling of the vehicle from the drive and brake system is effected by switching-off the electric magnet when an impermissible travel status within an area of the stopping zone is reached.

The invention bears the advantage that on existence of impermissible states it is not required to wait until these states are detected in an operation center lying far away from the vehicle and until appropriate countermeasures have been taken. Contrary, according to the present invention, the vehicle is immediately decoupled from the drive when a faulty traveling state is detected, for example by switching-off the carrying magnets in case of magnetic levitation vehicles, thus switching-off the excitation fields for the long-stator linear motor generated in the vehicle. Thereby, the ways for transmission and evaluation of corresponding switching signals are extremely short so that the vehicle can be safely brought to a standstill at the preselected target stopping points without overriding them by a considerable distance.

Other advantageous features of the present invention become evident from the subclaims.

The invention is explained in greater detail as set forth below, based on the drawings enclosed hereto and an embodiment of a magnetic levitation vehicle.

DESCRIPTION OF THE PREFERRED EMBODIMENTS

Figure 1:
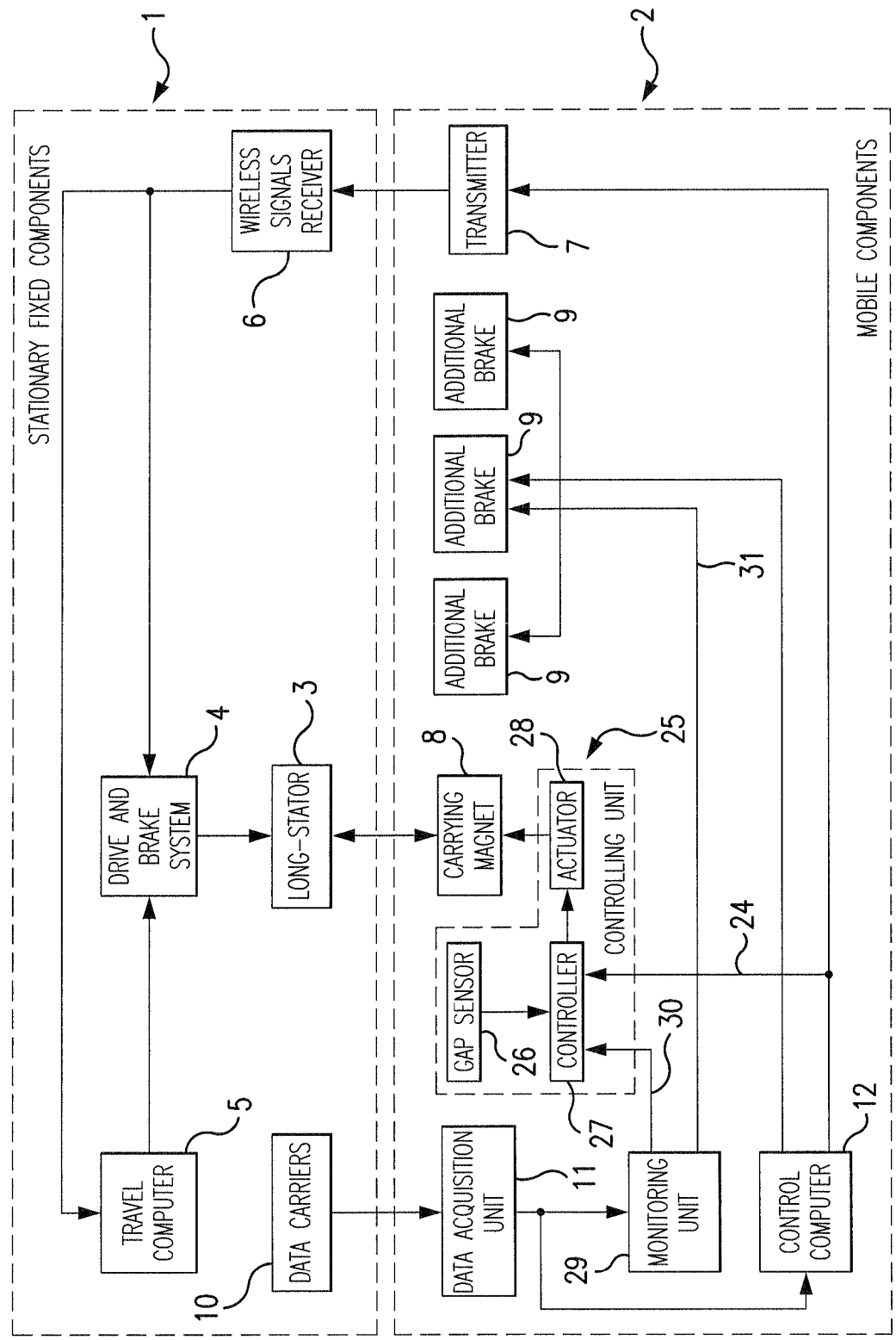
FIG. 1 shows a roughly schematic block-type circuit diagram of the device being the subject of the present invention, and FIG. 2 and FIG. 3 schematically show the possible braking behavior of a magnetic levitation vehicle when applying a device already known and an a device according to the present invention.

In FIG. 1, a block 1 indicates shows the stationarily fixed components, while a block 2 indicates the mobile components arranged in a magnetic levitation vehicle. Block 1 particularly comprises a long-stator 3 extending along a guideway and having grooves with alternating current windings inserted therein, a drive and brake system 4 and a travel computer 5, which for example is accommodated in an operation center. Furthermore, block 1 comprises a receiver 6 for wireless signals which is at least connected to the drive and brake system 4, said wireless signals being sent from a transmitter 7 arranged in the vehicle and containing data, for example on the present traveling state of the vehicle.

In vehicle or block 2, respectively, at least one carrying magnet 8 is particularly provided for, by way of which a gap of e.g. 10 mm is created between the vehicle and the long-stator 3 during traveling. Thereby, the vehicle is kept in a suspended status on the one hand, while on the other hand an excitation field for a synchronous long-stator linear motor is built-up, which comprises the long-stator 3 and drives the vehicle. Moreover, the vehicle comprises at least one additional brake 9 which for example may be a gripper brake, an eddy-current brake or the like.

Data carriers 10 being arranged along the track for example at distances of 200 m and including data in binary code on the location (position) at which they are mounted serve for a precise pick-up of the location at which the driverless vehicle is located. Assigned to these data carriers 10 is at least one data acquisition (detection) unit 11 mounted at the vehicle which scans the encoded location data and transmits them to a control computer 12 accommodated in the vehicle and connected with the transmitter 7.

The data acquisition unit 11 or the control computer 12 transform the data supplied by the information carriers 10 into actual-value signals which preferably indicate both the present location and the present speed of the vehicle. These actual-value signals are permanently transmitted from the control computer 12 to the transmitter 7. From there, they are transmitted in wireless mode to the receiver 6 and passed-on from there, for example, to the drive and brake system 4. The latter may be accommodated either in one of the numerous substations arranged along the guideway where the power inverters or the like linked to the windings of the long-stator 3 are accommodated, or it may be part of a higher-level operation management system arranged in the operation center by means of which the individual substations are controlled.

The operating mode of the device described hereinabove substantially is as follows:

During the travel of the vehicle along the guideway, the long-stator windings are fed by the aid of the drive and brake system 4 and non-shown power inverters installed in the substations or the like with a three-phase current of a variable amplitude and frequency in order to drive the vehicle at a speed which is synchronous to the traveling speed of the traveling wave generated by the power inverters. At the same time, the drive and brake system 4 is informed by the travel computer 5 about the speed at which the vehicle is to move at a distinct location. Compliance with this speed is monitored by means of a control circuit accommodated in the drive and brake system 4. On the one hand, the actual values of the vehicle location and vehicle speed are transmitted to this control circuit from the receiver 6, and on the other hand the control circuit receives the nominal values stored in the travel computer 5. The control circuit regulates then the electric currents and/or voltages supplied to the windings of the long-stator 3 in such a manner that any deviations of the actual values from the nominal values remain within tolerable limits.

Devices of the kind described hereinabove are widely known from the printed publications mentioned before, which for avoidance of repetitions are hereby made by reference a part of the present disclosure.

Figure 2:
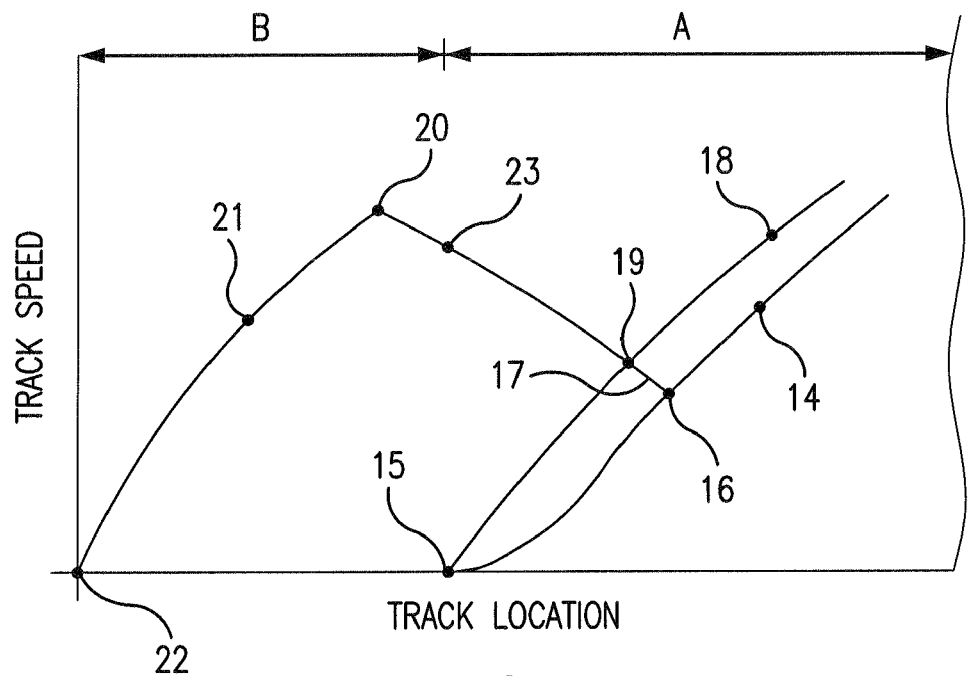

If it is intended to stop the vehicle in a stopping zone, e.g. in a railway station, the drive and brake system 4 is so controlled and regulated, for example in accordance with a braking curve 14 (FIG. 2) stored in the travel computer 5 or the control computer 12, respectively, that the traveling speed of the vehicle is gradually reduced along this braking curve 14. FIG. 2 shows the location data along the abscissa for a final section of a stopping zone A provided at the guideway and the preselected nominal traveling speed along the ordinate in the area of this stopping zone A. Accordingly, the vehicle is usually intended to come to a standstill at a preselected target stopping point 15.

Since the location and speed signals transmitted from the vehicle to the drive and brake system 4 or to the travel computer 5 are at first examined and evaluated by the operation management system and then possibly have to be transformed into actuating signals for the control circuit of the drive and brake system 4, time lags of noticeable duration most probably occur until faults or interferences will be detected and eliminated. A possible disturbance and its effect are indicated by way pf example in FIG. 2 at a point 16 of the braking curve 14. Here it is assumed that the disturbance entails an acceleration along a line 17 rather than a deceleration of the vehicle. This disturbance is usually discovered in the control computer 12 of the vehicle based upon data which are also stored therein and prescribe a permissible maximum speed for every position along the guideway as indicated by a line 18 on FIG. 2.

As soon as the increasing traveling speed along line 17 intersects the line 18 at a location 19, i.e. when the permissible maximum speed has been reached and/or is exceeded, the control computer 12 issues a control signal according to the command "switching-off of the drive and brake system", which signal is fed to the transmitter 7, passed on to the drive and brake system 4 and/or to the travel computer 5 and there transformed into a switch-off signal for the drive and brake system 4. The transformation into the command for switching-off, however, is performed with some delay in time. It will only become effective on FIG. 2 at a location 20, so that from location 20 onward, the actual delay of the vehicle occurs along line 21 which corresponds to the braking curve 14, runs in parallel to it and comes to an end at a stopping point 22. One consequence hereof is that the vehicle does not come to a standstill at the preselected target stopping point 15, but only at a stopping point 22. Therefore, the stopping zone A cannot terminate at the preselected target stopping point 15 as it would be desirable. Instead, particularly in case of a terminal railway station or the like, it would have to be extended for safety considerations by a distance B that terminates at the stopping point 22. For magnetic levitation vehicles, the guideway section to be additionally reserved for the distance B would have to amount to 30 m to 100 m, for example, which depends for instance on the traveling speed at which the vehicle moves into the stopping zone A, and on the possible acceleration of the vehicle along a line 23 on FIG. 2 during the time lag.

The delay in braking as described hereinabove may also occur, though in restricted extent, if a braking signal generated when exceeding the maximum speed is transmitted from the control computer 12 directly to the additional brake 9 in order to activate it as indicated on FIG. 1 and as is actually known.

To avoid the disadvantage described hereinabove, the present invention provides for transmitting those signals which indicate that the permissible maximum speed is reached, e.g. via a line 24 also directly to the carrying magnet 8 or to a controlling unit 25 utilized for the control and regulation thereof. This unit 25 usually contains a gap sensor 26 and a controller 27 linked to it which compares the actual value of the carrying gap supplied from the gap sensor 26 with a prescribed nominal value and feeds the differential value thus obtained to an actuator 28 that controls and regulates the electric current through the carrying magnet 8 in such a manner that the size of the gap remains mainly constant during the travel. The corresponding arrangement is so chosen that the signal supplied from the control computer 12 via the line 24 leads to an immediate deactivation of the carrying magnet 8 with the consequence that it becomes de-energized. On the one hand, the excitation field of the long-stator linear motor is thereby switched-off and therefore, the vehicle is no longer driven. On the other hand, the load-bearing capacity of the carrying magnet 8 is lost, whereby the vehicle is set-down with its skids on gliding strips of the guideway and thus slowed-down additionally.

The control computer therefore constitutes means for safely stopping and/or starting the vehicle, by switching-off the carrying magnet (8).

Thus, by taking the measures described hereinabove, an immediate decoupling of the vehicle from the drive and brake system 4 is achieved. This decoupling occurs as soon as reaching or exceeding the permissible maximum speed is noticed in the vehicle. Overriding the target stopping point 15 on FIG. 2 due to delays which have hitherto been inevitable due to the described transmission and evaluation of signals in wireless mode, therefore, is widely impossible, regardless of whether the drive and brake system 4 itself still remains turned-on or not for a distinct period of time.

In conformity with a particularly preferred embodiment example of the present invention, the location-dependent permissible maximum speeds for the vehicle, at least in the area of the stopping zones (e.g. in the area A according to FIG. 2) are additionally applied on the data carriers 10. These data are transmitted from the data acquisition unit 11 to a monitoring unit 29 accommodated in the vehicle. Unit 29 calculates the present vehicle speed, for example from the location signals also supplied by the data acquisition unit 11, and compares it with a read-out permissible maximum speed. If the latter is reached or exceeded, the monitoring unit 29 issues a signal for deactivating the carrying magnet 8 via an output 30 coupled with the control unit 25 and at the same time, via a line 31, it issues a signal for switching-on the additional brake 9. Thereby, it is assured that the vehicle is slowed-down immediately without any time lag when the permissible maximum speed is reached. This is schematically shown on FIG. 3 in which equal components are designated with the same reference numerals as those in FIG. 2. Accordingly, when reaching the maximum speed at location 19, a decoupling of the vehicle from the drive and brake system 4 occurs immediately and the vehicle is therefore slowed-down by the aid of the additional brake 9 and the gliding skids along the curve 18 which corresponds to the permissible maximum speed. Consequently, a safe and secure stoppage of the vehicle at the preselected target stopping point 15 is achieved as in the case described at first. An extension of the guideway in the stopping zone A by the distance B (FIG. 2) is therefore not required when applying the present invention. It is virtually impossible to exceed the braking curve 18, particularly if the data and information concerning the permissible maximum speed in the area of the stopping zone A are delivered consecutively within short intervals.

The monitoring unit (29) therefore forms means for safely stopping and/or starting the vehicle, by switching-off the electric magnet (8).

Figure 3:
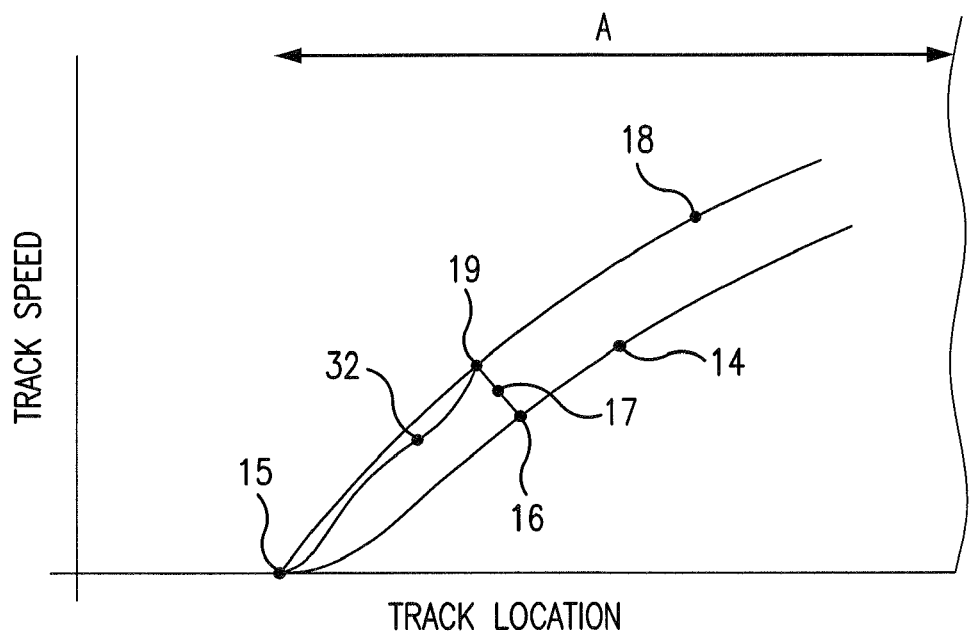

If the speed of the vehicle temporarily falls—because of the measures described hereinabove—under the permissible maximum speed, e.g. as shown at a position 32 in FIG. 3, then it is possible to release the additional brake 9 again, to switch-on again the flow of electric current through the carrying magnet 8, and to re-activate the drive and brake system 4 in order to bring the vehicle in a usual manner to a standstill.

A special advantage of the embodiment of the present invention comprising the monitoring unit 29 lies in that it works independently of the other components, and in particular independent of both the control computer 12 and of the travel computer 5, and that it is easy to implement while being safe and secure.

According to the present invention, the device described hereinabove is preferably supplemented to the effect that even a start-up in a preselected direction is made safe and secure. Normally, the stopping zone should for safety's sake also be provided with the track section B as long as it is possible for the vehicle to pass unrestrictedly through the track section B in FIG. 2 due to delays in signal transmission and signal evaluation, for example, although it actually would have had to start from the target stopping point 15 into the direction of the route section A. According to the present invention, this is avoided by providing the data carriers 10 or additional data carriers with data and information that allow an unambiguous identification of the actual direction of travel of the vehicle by means of the monitoring device 29 or by means of the control computer 12. By the aid of the data and information being stored in the monitoring unit 29 or in the control computer 12 and concerning the preselected direction of travel, it is therefore possible during a starting phase to identify and realize within the vehicle itself, i.e. within the shortest possible time, whether the actual direction of travel corresponds with the nominal direction of travel. As in those cases described hereinabove, an immediate decoupling of the vehicle from the drive and brake system 4 is effected in case of a traveling state considered wrong by switching-off the carrying magnet 8, while an immediate switching-on of the additional brake 9 is effected at the same time. Thereby, the vehicle can just, if at all, move by a very small distance into the wrong direction, particularly if the data carriers include data and information within very short intervals, on the basis of which the present vehicle direction can be identified and picked-up. The hitherto comparably large guideway section B (FIG. 2) is thus reduced substantially.

The invention is not limited to the embodiments described hereinabove that can be modified in a plurality of ways. In particular this applies to the design of the data carriers 10, the data acquisition unit 11, and the monitoring unit 29 which may also be configured as a component part of the control computer 12. Accordingly, it is basically and in principle not important whether the evaluation of the data and information scanned from the data carrier 10 is already performed in the data acquisition unit 11 or only in the control computer 12 or in the monitoring unit 29. Furthermore it is self-evident that magnetic levitation vehicles of the kind as described before usually comprise a plurality of carrying magnets 8, additional brakes 9, data acquisition units 11 etc., which work largely redundant and which therefore are preferably operated entirely in the same manner as described hereinabove for the device according to FIG. 1. Moreover it is possible to apply the device according to the present invention on other, especially driverless, vehicle systems, too. Instead of a switching-off of carrying magnets, a procedure to be contemplated here is e.g. the decoupling of the vehicle from a drive and brake system by retracting or switching-off a power collector or the like. Finally it is self-explanatory that the different features can also be applied in combinations other than those described and shown hereinabove.

The invention claimed is:

1. A device for automatically controlling a track-bound magnetic levitation vehicle, comprising a drive and brake system for the vehicle, said system including a long-stator linear motor with at least one long-stator arranged along a guideway and at least one electric magnet mounted at the vehicle which is switched-on during a travel and thus keeps the vehicle in a suspended status while furnishing at the same time an excitation field for the long-stator linear motor; stopping zones arranged along the guideway; an additional brake at the vehicle; a travel computer for the drive and brake system, with said travel computer being stationarily arranged outside the vehicle; data carriers arranged along the guideway for a supply of status signals concerning a location, speed and/or travel direction of the vehicle; and means provided in the vehicle for switching-off the drive and brake system and for switching-on the additional brake, if a scanning of the data carriers reveal an impermissible travel status for the vehicle, said means being arranged for safely stopping and/or starting the vehicle at or from preselected target stopping points within the stopping zones and being so configured that an immediate decoupling of the vehicle from the drive and brake system is effected by switching-off the electric magnet when an impermissible travel status within an area of the stopping zone is reached, wherein the decoupling of the vehicle from the drive and brake system as well as the switching-on of the additional brake are effected when the vehicle starts into a wrong travel direction during a start within the stopping zone.

2. A device for automatically controlling a track-bound magnetic levitation vehicle, comprising a drive and brake system for the vehicle, said system including a long-stator linear motor with at least one long-stator arranged along a guideway and at least one electric magnet mounted at the vehicle which is switched-on during a travel and thus keeps the vehicle in a suspended status while furnishing at the same time an excitation field for the long-stator linear motor; stopping zones arranged along the guideway; an additional brake at the vehicle; a travel computer for the drive and brake system, with said travel computer being stationarily arranged outside the vehicle; data carriers arranged along the guideway for a supply of status signals concerning a location, speed and/or travel direction of the vehicle; and means provided in the vehicle for switching-off the drive and brake system and for switching-on the additional brake, if a scanning of the data carriers reveal an impermissible travel status for the vehicle, said means being arranged for safely stopping and/or starting the vehicle at or from preselected target stopping points within the stopping zones and being so configured that an immediate decoupling of the vehicle from the drive and brake system is effected by switching-off the electric magnet when an impermissible travel status within an area of the stopping zone is reached, wherein the data carriers (10) contain data and information located along the guideway to identify a real direction of travel in order to ensure a safe start-up of the vehicle in the area of a stopping zone, that said means (12, 29) store data which indicate a preselected direction of travel, and that said means (12, 29) are so configured that an immediate decoupling of the vehicle from the drive and brake system (4) as well as an immediate switching-on of the additional brake (9) is effected when a deviation of the real travel direction from the preselected travel direction occurs.

* * * * *